No. 887,028. PATENTED MAY 5, 1908.
J. L. BORSCH, Jr.
PROCESS OF MANUFACTURING BIFOCAL LENSES.
APPLICATION FILED APR. 29, 1904.

FIG. I.

FIG. IV.

FIG. II. FIG. III. FIG. V. FIG. VI.

FIG. VII. FIG. VIII.

FIG. IX. FIG. X.

WITNESSES:

INVENTOR:
John L. Borsch, Jr.
By his Attorney

UNITED STATES PATENT OFFICE.

JOHN L. BORSCH, JR., OF PHILADELPHIA, PENNSYLVANIA, ASSIGNOR, BY MESNE ASSIGNMENTS, TO KRYPTOK COMPANY, A CORPORATION OF NEW YORK.

PROCESS OF MANUFACTURING BIFOCAL LENSES.

No. 887,028.  Specification of Letters Patent.  Patented May 5, 1908.

Original application filed January 23, 1904, Serial No. 190,257. Divided and this application filed April 29, 1904. Serial No. 205,489.

*To all whom it may concern:*

Be it known that I, JOHN L. BORSCH, Jr., a citizen of the United States, residing in the city of Philadelphia, county of Philadelphia, and State of Pennsylvania, have invented certain new and useful Improvements in the Process of Manufacturing Bifocal Lenses, of which the following is a specification.

My invention relates to improvements in the process of the manufacture of lenses employed in spectacle, eye glass and other optical instruments, of that class having a plurality of independent focal points.

A lens constructed or manufactured in accordance with my invention consists of a single, integral piece of glass having a plurality of regions therein of different or dissimilar refractive power.

In the manufacture of a lens in accordance with my invention, I may take a piece of glass having suitable dimensions, the said glass being composed of ordinary lens material, such as crown glass, and form a depression therein, and then take another piece of glass having an index of refraction different from that of the first-named piece of glass, and grind the same so that it will fit snugly within the said depression or cavity and, place it therein, and subject the whole to a temperature or heat sufficient to occasion coalescence of the two pieces; that is, subject the same to a temperature sufficient to cause the two pieces of glass to fuse together to form a single, integral, homogeneous plate of glass.

If it is not desired to form a depression in the first-named piece of glass, a second, and preferably smaller, piece of glass may be laid upon the smooth surface of the first-named piece of glass, after which, by subjecting the two glasses to a temperature such as above indicated, they may be caused to coalesce or fuse into a single, integral piece of glass.

Although the latter method of construction or manufacture may be employed, I regard the first method of construction referred to as being preferable.

Instead of laying one piece of glass upon another, the edges of two or more pieces of glass may be brought into contact and held in that position while they are subjected to heat, as above indicated, to cause the edges to unite to form a single, integral and homogeneous piece of glass.

After the pieces of glass having different or dissimilar indices of refraction have been welded or fused together to form a single, integral, homogeneous piece of glass, in one or the other of the ways above indicated, they are formed into lenses suitable for use by grinding in the usual manner.

It will be understood that the lenses may be ground to any desired curvature or other form, the same as is usual in the manufacture of spectacle, eye glass, and other optical lenses.

Referring to the drawings forming a part of this specification:—

Figure I is a plan view of a plate showing in outline a smaller portion or section of plate, the two plates having different indices of refraction;

Figure II is a central transverse section of the plates shown in Figure I;

Figure III is a section of a spherical lens formed from the plate shown in Figure I;

Figure IV is a plan view of a plate of glass having two smaller portions or sections of glass embedded in the surface thereof, the three pieces of glass having dissimilar or different indices of refraction;

Figure V is a transverse section through the three pieces of glass shown in Figure IV;

Figure VI is a section of a double convex lens formed from the plate shown in Figure IV;

Figure VII is a section corresponding to the section shown in Figure II, but indicating a modified method of construction;

Figure VIII is a section of a double convex lens formed from the plate shown in Figure VII;

Figure IX is a transverse section of a spherical lens formed from a piece of glass having its edges secured together by means of the application of heat; and Figure X is a transverse section of a prismatic glass having two portions of glass secured together in the same manner as is the case in Figure IX.

In Figures I to III of the drawings,—

1 designates a piece of glass of a selected index of refraction, having a depression or cavity 2 formed therein, which is adapted to receive a piece of glass 3 having a selected index of refraction different from that of the index of refraction of the main or body portion of the glass 1. The refractive power of the portion of glass 3, combined with the refractive power of the portion of the glass 1, which overlies the portion 3, produces a net coefficient of refraction distinct from that of the remaining portion of the glass, and may be of any desired power.

It will be understood that the depression or cavity is formed in the body portion of the glass 1, and that the smaller piece is ground to a form to fit into the said depression or cavity. Afterwards the parts are assembled, and the whole subjected to a heating process for the purpose of raising the temperature to a point at which the glass is partially fused, to occasion the coalescence or fusing of the two pieces of glass together to form a single, integral piece of glass, which may be ground to any curvature or other form desired, as, for instance, spherical, as indicated in Figure III.

The construction and method of manufacture indicated in Figures IV, V and VI are substantially the same as that shown in Figures I to III, the only difference being that two different pieces of glass 3, each having a different index of refraction, and each also having a different index of refraction from the piece of glass 1, within which they are embedded, and to which they are secured by fusing or welding, in the manner previously stated with reference to the construction shown in Figures I, II and III.

By employing the two pieces of glass 3, as indicated in Figures IV, V and VI, a lens is produced having three independent focal points, while in the form of construction indicated in Figures I to III, inclusive, in which only one piece of glass 3 is embedded in the main body of glass 1, a lens is produced having two distinct and independent focal points.

As illustrated in Figure VII, the method of manufacture is somewhat different from that shown in the preceding Figures I to VI of the drawings, the difference being that in the method of construction illustrated in the said Figure VII, the piece of glass 4 is laid upon the smooth portion of the main or body portion 1 of the glass out of which the lens is formed, after which the two pieces are subjected to heat in the same manner as in the constructions illustrated in Figures I to VI, inclusive, whereby the fusing or welding together of the two pieces of glass is effected, after which the lens is formed by grinding to any suitable curvature or other form which may be desired.

The dotted lines 5 shown in Figure VII indicate the outline of a double convex lens, such lens being shown in full lines in Figure VIII.

Figures IX and X of the drawings indicate a method of construction in which two pieces of glass 6 and 7, each having a different index of refraction, are placed in contact with each other, edge to edge, and subjected to a heat to raise them to a temperature at which partial fusion takes place, so as to occasion the fusing or welding together of the said pieces of glass, after which they may be ground spherical, as indicated in Figure IX, prismatic, as indicated in Figure X, or to any other suitable curvature or form desired.

The line of junction or connection between the portions of glass of different refractive power embodied in the lens is clearly indicated in the several figures of the drawings.

It will be understood that any suitable furnace or other means may be employed for subjecting the glass to heat to raise the same to the temperature necessary to occasion the coalescence or welding together of the separated pieces of glass in the process of manufacturing eye glass or other optical lenses embodying my invention.

Having thus described my invention, I claim:—

1. The process of manufacturing spectacle and eyeglass lenses which consists in placing two pieces of glass of different indices of refraction in contact with each other, then subjecting the same to heat to occasion the coalescence or welding together of the same and finally grinding, shaping and finishing the combined pieces into a lens having two focal points one of which includes both kinds of glass and the other a single kind of glass.

2. The process of manufacturing spectacle and eyeglass lenses which consists in placing two pieces of glass of different indices of refraction in contact with each other, then subjecting the same to heat to occasion the coalescence or welding together of the same, and finally grinding, shaping and finishing the combined pieces into a lens having even surfaces and two focal points one of which includes both kinds of glass and the other a single kind of glass.

3. The process of manufacturing spectacle and eyeglass lenses which consists in forming a cavity in a piece of glass of a certain index of refraction, placing another piece of glass of a different index of refraction in said cavity, then subjecting the assembled pieces to heat until they are welded or fused into a single homogeneous block or blank, and finally grinding, shaping and finishing the block or blank into a lens having two focal points one of which includes glass of both indices of refraction and the other glass of a single index of refraction.

4. The process of manufacturing bifocal spectacle and eyeglass lenses which consists in fusing together two bodies of glass of different indices of refraction to form an integral body, then grinding, shaping and finishing said integral body into a lens having two focal points, one of which includes glass of both indices of refraction and the other glass of a single index of refraction.

5. The process of manufacturing spectacle, eye glass, or other optical lenses, consisting in grinding or otherwise forming a depression in the surface of one piece of glass, placing in said depression a piece of glass, the said piece of glass being of a form to fit snugly the said depression, subjecting the whole to heat to occasion the coalescence or welding together of the plurality of pieces of glass, and afterwards grinding the same to the curvature or other form desired.

6. The process of manufacturing spectacle, eye glass, or other bifocal lenses, which consists in forming a depression in one piece of glass, placing in said depression a second piece of glass, subjecting both pieces of glass to heat to occasion the fusing or welding together thereof, and afterwards grinding the same to the form desired.

7. The method of producing a one-piece bifocal lens, which consists in preparing a cavity in a block of glass, preparing a segment of glass differing in kind from said block to fit the cavity of the latter, assembling the segment and said block, and subjecting the block and segment to heat to weld or fuse the same into an integral structure.

8. The method of producing a one-piece bifocal lens, which consists in preparing a concave cavity in a block of glass, preparing a segment of glass differing in density from said block to fit said concave cavity, assembling the segment and said block, and subjecting said block and segment to heat to weld or fuse the same into an integral structure.

9. The method of producing a one-piece bifocal lens, which consists in preparing a concave cavity in a block of glass, preparing a convex surface upon a segment of glass differing in density from said block so that said convex surface will fit the concave cavity of the block, assembling the segment and said block, and subjecting the block and segment to heat to weld or fuse the same into an integral structure.

10. The method of producing a one-piece bifocal lens, which consists in preparing a cavity in a block of glass, preparing a segment of glass differing in kind from said block to fit the cavity of the latter, assembling the segment and said block, subjecting the block and segment to heat to weld or fuse the same into an integral structure, and grinding or polishing the surfaces of the structure to the required curvature.

11. The process of making a one-piece bifocal lens, which consists in preparing a cavity in a block of glass, preparing a segment of glass differing in density or refractive index to be placed in said cavity, assembling the segment and block, and subjecting the same to the action of heat to weld or fuse the same into an integral structure.

In testimony that I claim the foregoing as my invention, I have hereunto signed my name this 25th day of April, A. D. 1904.

JOHN L. BORSCH, Jr.

In the presence of—
THOS. K. LANCASTER,
LAURA KLEINFELDER.